(12) United States Patent
Roxworthy et al.

(10) Patent No.: US 11,550,171 B2
(45) Date of Patent: *Jan. 10, 2023

(54) TECHNIQUES FOR PHASE SHIFTING BY A PHOTONIC RESONATOR

(71) Applicant: AEVA, INC., Mountain View, CA (US)

(72) Inventors: Brian J. Roxworthy, San Jose, CA (US); Pradeep Srinivasan, Fremont, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,283

(22) Filed: Nov. 30, 2021

(65) Prior Publication Data

US 2022/0221742 A1 Jul. 14, 2022

Related U.S. Application Data

(63) Continuation of application No. 17/149,280, filed on Jan. 14, 2021, now Pat. No. 11,209,677.

(51) Int. Cl.
*G02F 1/01* (2006.01)
*G02F 1/225* (2006.01)
*G02F 1/21* (2006.01)
*G02B 6/12* (2006.01)
*G01S 17/89* (2020.01)

(52) U.S. Cl.
CPC ....... *G02F 1/0147* (2013.01); *G02B 6/12007* (2013.01); *G02F 1/212* (2021.01); *G02F 1/2255* (2013.01); *G01S 17/89* (2013.01)

(58) Field of Classification Search
CPC ... G02B 6/12007; G02B 6/125; G02F 1/0147; G02F 1/212; G02F 1/2255; G01S 17/89
USPC .............................................. 385/1–3, 32, 41
See application file for complete search history.

(56) References Cited

U.S. PATENT DOCUMENTS

| 11,209,677 B1* | 12/2021 | Roxworthy | G02F 1/212 |
| 2007/0147724 A1* | 6/2007 | Ishizaka | G02F 1/035 385/8 |
| 2008/0219614 A1* | 9/2008 | Gill | G02F 1/225 385/3 |
| 2017/0090268 A1 | 3/2017 | OSullivan | |
| 2019/0011558 A1 | 1/2019 | Crouch et al. | |

* cited by examiner

*Primary Examiner* — Michael P Mooney
(74) *Attorney, Agent, or Firm* — Womble Bond Dickinson (US) LLP

(57) ABSTRACT

An interferometer comprises a plurality of waveguide branches comprising a plurality of bus waveguides and a plurality of photonic resonators. A first waveguide branch of the plurality of waveguide branches comprises a first photonic resonator coupled to a first bus waveguide. The first photonic resonator is disposed to couple and circle a first portion of an optical beam at the first photonic resonator to generate a first phase shift of the first portion of the optical beam, where the first phase shift is the same as a second phase shift of a second photonic resonator coupled to a second bus waveguide.

19 Claims, 9 Drawing Sheets

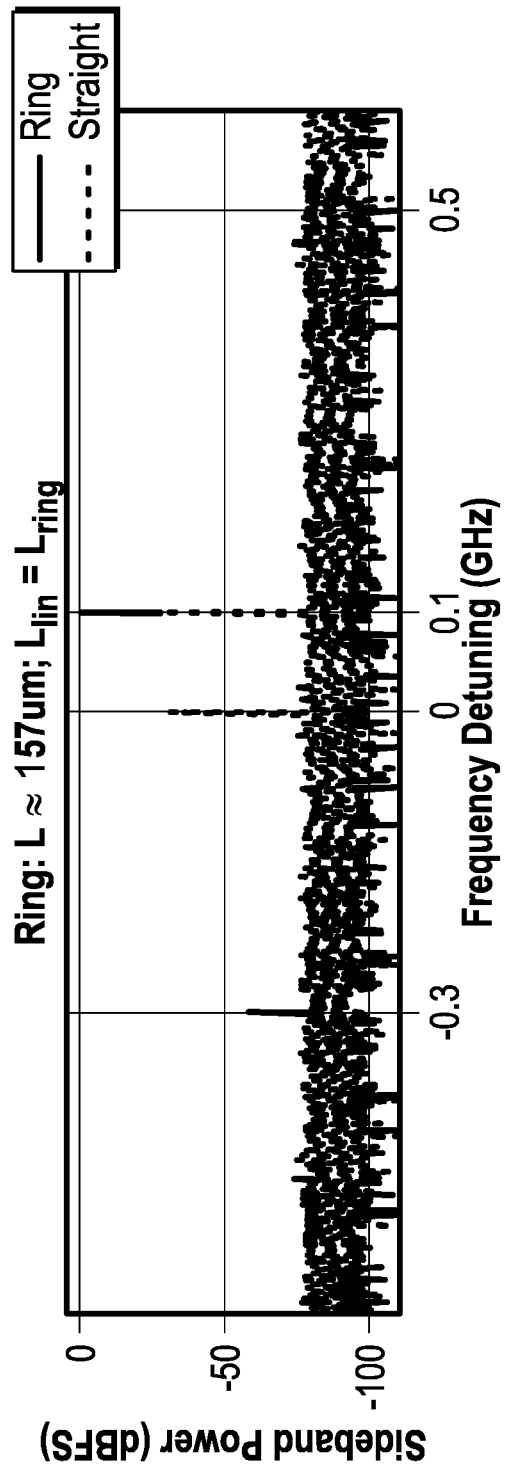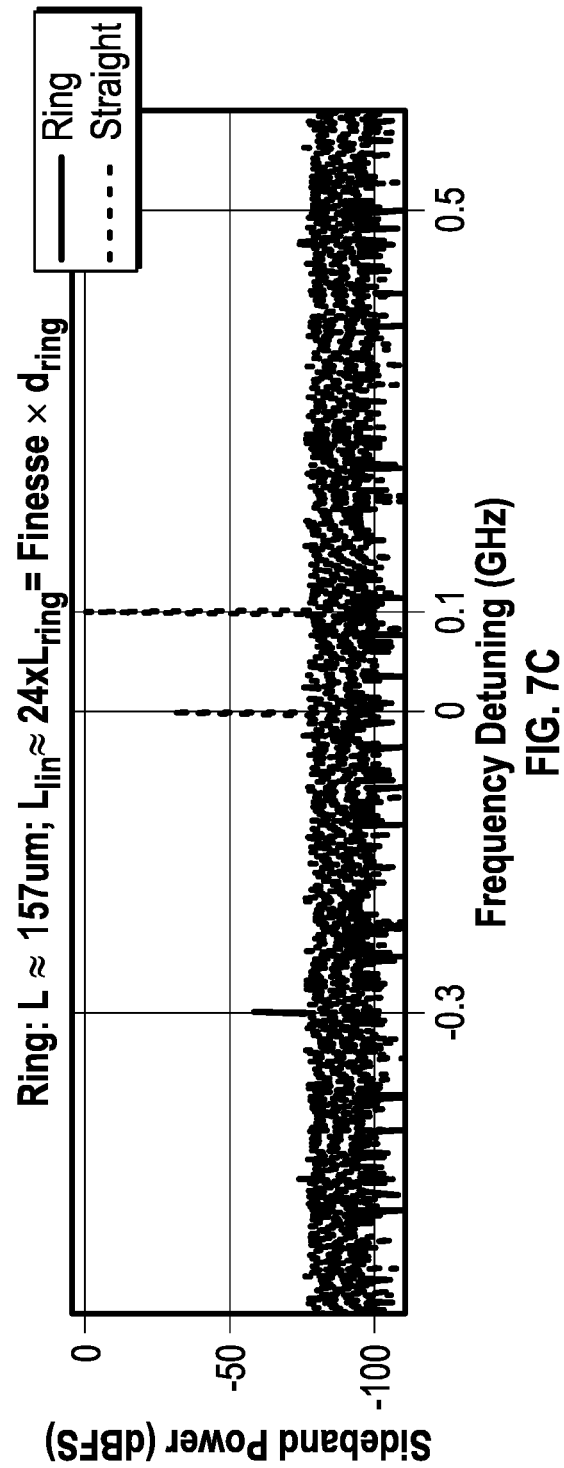

TECHNIQUES FOR PHASE SHIFTING BY A PHOTONIC RESONATOR

RELATED APPLICATIONS

This application is a continuation of U.S. patent application Ser. No. 17/149,280 filed on Jan. 14, 2021, the entire contents of which are incorporated herein by reference in their entirety.

TECHNICAL FIELD

The present disclosure relates generally to optical frequency shifting (OFS), and more particularly to an in-phase and quadrature (IQ) modulator in a light detection and ranging (LiDAR) system.

BACKGROUND

OFS is a key aspect of integrated microwave photonics (IMWP) with applications in signal processing, heterodyne interferometry, optical communications, and LiDAR systems. IQ modulators are commonly employed for OFS, as the IQ modulators enable carrier suppression, single-sideband modulation, and offer a large conversion efficiency (CE) to the first-order sideband. However, conventional integrated IQ modulators use straight waveguide sections that cause large device footprints as well as large optical and radio frequency (RF) losses that can lead to low CE, poor suppression of third and higher-order harmonics, and drive up power consumption and noise.

SUMMARY

The present disclosure describes various examples of OFS devices, e.g., an IQ modulator comprising photonic resonators in a LiDAR system.

In one example, an interferometer comprises a set of waveguide branches, where each waveguide branch of the set of waveguide branches is disposed to shift a phase of a corresponding portion of an optical beam. Each waveguide branch comprises a bus waveguide and a photonic resonator coupled to the bus waveguide, where the photonic resonator is disposed proximate to the bus waveguide, and where the photonic resonator is disposed to couple and circle the corresponding portion of the optical beam, at the photonic resonator, one or more times to shift the phase of the corresponding portion of the optical beam.

In one example, a LiDAR system comprises an optical source to emit an optical beam. The LiDAR system comprises an IQ modulator. The IQ modulator comprises a set of waveguide branches, where each waveguide branch of the set of waveguide branches is disposed to shift a phase of a corresponding portion of the optical beam. Each waveguide branch comprises a bus waveguide and a photonic resonator coupled to the bus waveguide, where the photonic resonator is disposed proximate to the bus waveguide, and where the photonic resonator is disposed to couple and circle the corresponding portion of the optical beam, at the photonic resonator, one or more times to shift the phase of the corresponding portion of the optical beam.

In one example, a method of optical frequency shifting comprises receiving an optical beam from an optical source, and directing the optical beam to a set of waveguide branches to shift a phase of a corresponding portion of the optical beam at each waveguide branch of the set of waveguide branches. The method further includes coupling the corresponding portion of the optical beam to each photonic resonator of a set of photonic resonators, where each photonic resonator of the set of resonators is disposed proximate to a corresponding bus waveguide of each waveguide branch. The method further includes circling the corresponding portion of the optical beam to circle one or more times around each photonic resonator of the set of photonic resonators to shift the phase of the corresponding portion of the optical beam.

As an example, disclosed herein is an integrated photonic IQ Modulator, for example, a microring IQ modulator based on microring resonators in a nested Mach-Zehnder interferometer. The integrated photonic IQ modulator includes photonic resonators. The integrated photonic IQ modulator is capable of synthesizing a multitude of RF spectra with a low optical loss, a large CE, a large sideband suppression, and a physically compact design. The photonic IQ modulator leverages the resonant optical enhancement provided by the photonic resonators to greatly reduce the physical footprint of the device compared to conventional linear Mach-Zehnder modulators. The photonic IQ Modulator uses photonic resonators as key functional elements in constructing the IQ modulator. By taking advantage of the resonance enhancement of the photonic resonators, the physical footprint, power consumption, and optical losses of the photonic IQ modulator are all significantly reduced with respect to linear Mach-Zehnder frequency shifting modulators.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements:

FIG. 7B is another diagram illustrating an example of RF response of a photonic IQ modulator according to embodiments of the present disclosure.

FIG. 7C is a diagram illustrating a comparison of the RF response of a linear IQ modulator having length designed to match the power in the sideband, according to embodiments of the present disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LIDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

Range and velocity profile of a target may be measured using a coherent LiDAR system, e.g., a FMCW LiDAR system, where backscattered light from the target may be mixed with an LO signal to generate a coherent heterodyne signal, from which range and velocity information of the target may be extracted. Maximizing a collection and mixing efficiency of a scattered target signal with the LO signal is important to increase a signal-to-noise ratio (SNR) of the system, which in turn enhances a detection sensitivity. The target may scatter an incident light into scattered light with multiple arbitrary polarization states, regardless of a polarization state of the incident light. By maximizing the collection and mixing of the scattered target signal with the LO signal in all polarization states, an improvement in the SNR of the system may be realized.

Figure 1:
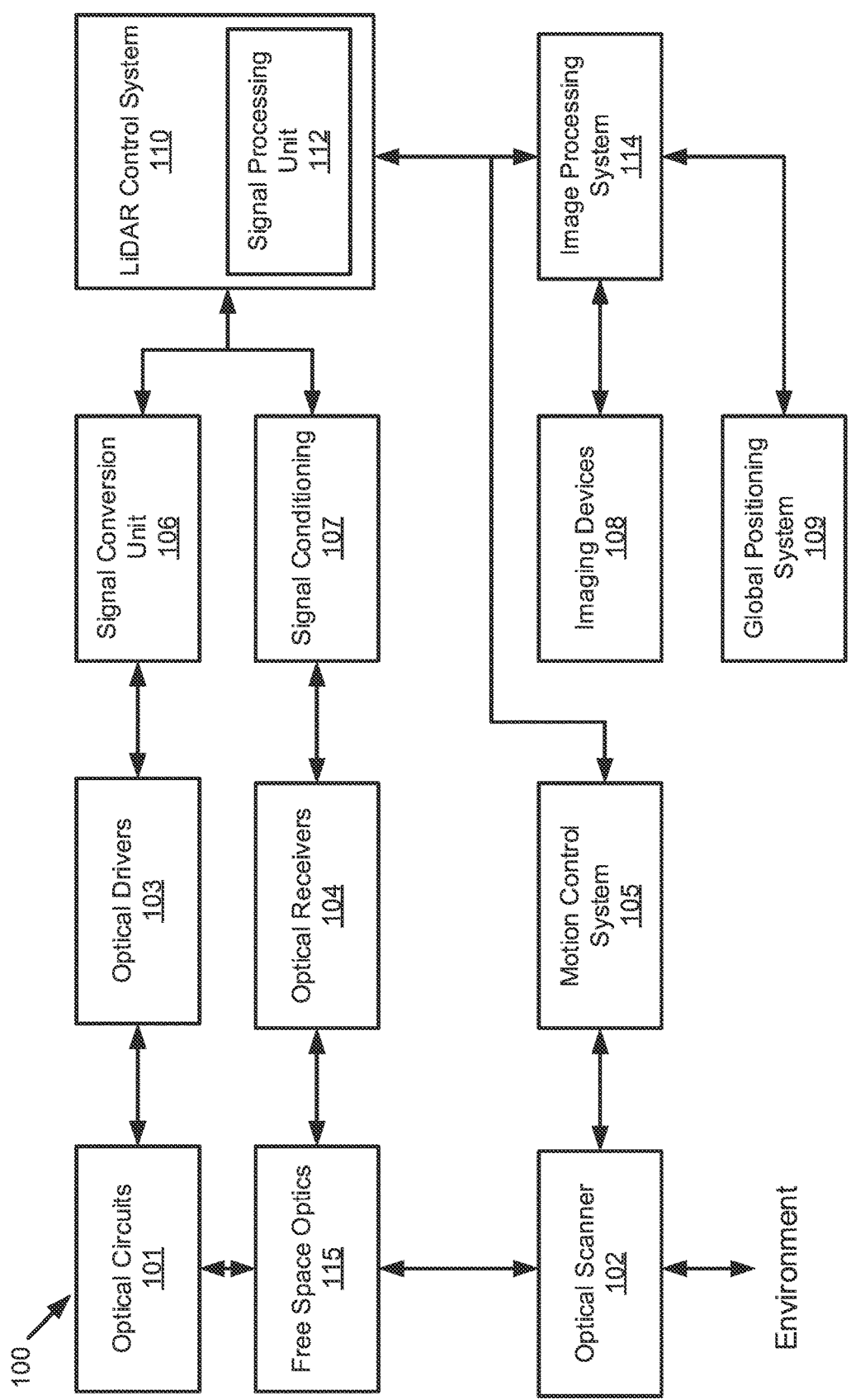
FIG. 1 is a block diagram illustrating an example LiDAR system according to embodiments of the present disclosure.

FIG. 1 illustrates a LiDAR system 100 according to example implementations of the present disclosure. The LiDAR system 100 includes one or more of each of a number of components, but may include fewer or additional components than shown in FIG. 1. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. For example, the optical circuits 101 may include optical sources such as lasers. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LIDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LIDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LIDAR system 100.

In operation, according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
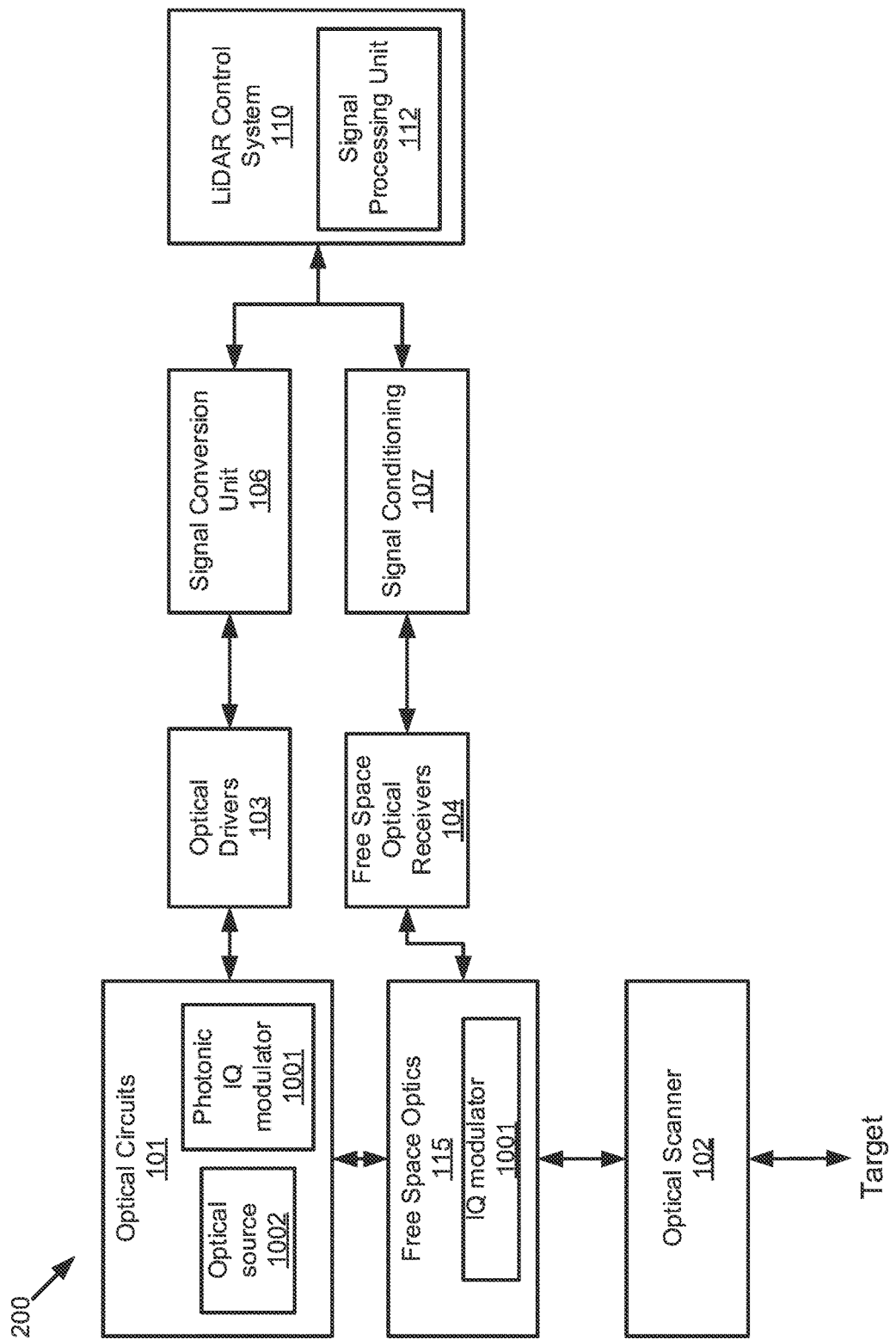
FIG. 2 is a diagram illustrating an example of a LiDAR system that includes a photonic IQ modulator using photonic resonators according to embodiments of the present disclosure.

FIG. 2 is a diagram illustrating an example of a LiDAR system 200 that includes a photonic IQ modulator 1001 that uses photonic resonators according to embodiments of the present disclosure. The LiDAR system 200 includes optical circuits 101 implemented on a photonics chip.

For example, the optical circuits 101 may include an optical source 1002 to emit an optical beam. In one embodiment, the optical circuits 101 may include the photonic IQ modulator 1001. In another embodiment, the free space optics 115 may include the photonic IQ modulator 1001.

According to some embodiments, the photonic IQ modulator 1001 may include a Mach-Zehnder interferometer. The Mach-Zehnder interferometer may include a plurality of waveguide branches, where each waveguide branch of the plurality of waveguide branches is disposed to shift a phase of a corresponding portion of the optical beam. Each waveguide branch may include a bus waveguide and a photonic resonator. The photonic resonator is coupled to the bus waveguide, where the photonic resonator is disposed proximate to the bus waveguide, and where the photonic resonator is disposed to couple and circle the corresponding portion of the optical beam, at the photonic resonator, one or more times to shift the phase of the corresponding portion of the optical beam.

In one example, the photonic resonator may include a microring resonator. The photonic IQ modulator 1001 may include a ring IQ modulator (RIQM). In one example, the microring resonator may include a phase shifter section and a bare waveguide section, and where the phase shifter section includes a thermo-optic phase shifter section or a plasma dispersion phase shifter section. In one example, each waveguide branch further includes a directional coupler formed by a physical separation of the microring resonator from the bus waveguide with a gap. In one example, the Mach-Zehnder interferometer further includes a plurality of resistive heaters, wherein each resistive heater is positioned adjacent to a coupling region of a corresponding microring resonator to tune a resonant wavelength of the corresponding microring resonator to match an operating wavelength.

In accordance with the embodiments described and depicted in the present disclosure, the photonic IQ modulator 1001 leverages the resonant optical enhancement provided by the photonic resonators to greatly reduce the physical footprint of the device compared to conventional linear Mach-Zehnder modulators. The compact design, along with tailored RF drive signatures, yields lower optical and RF losses, higher CE, and better sideband suppression.

Figure 3:
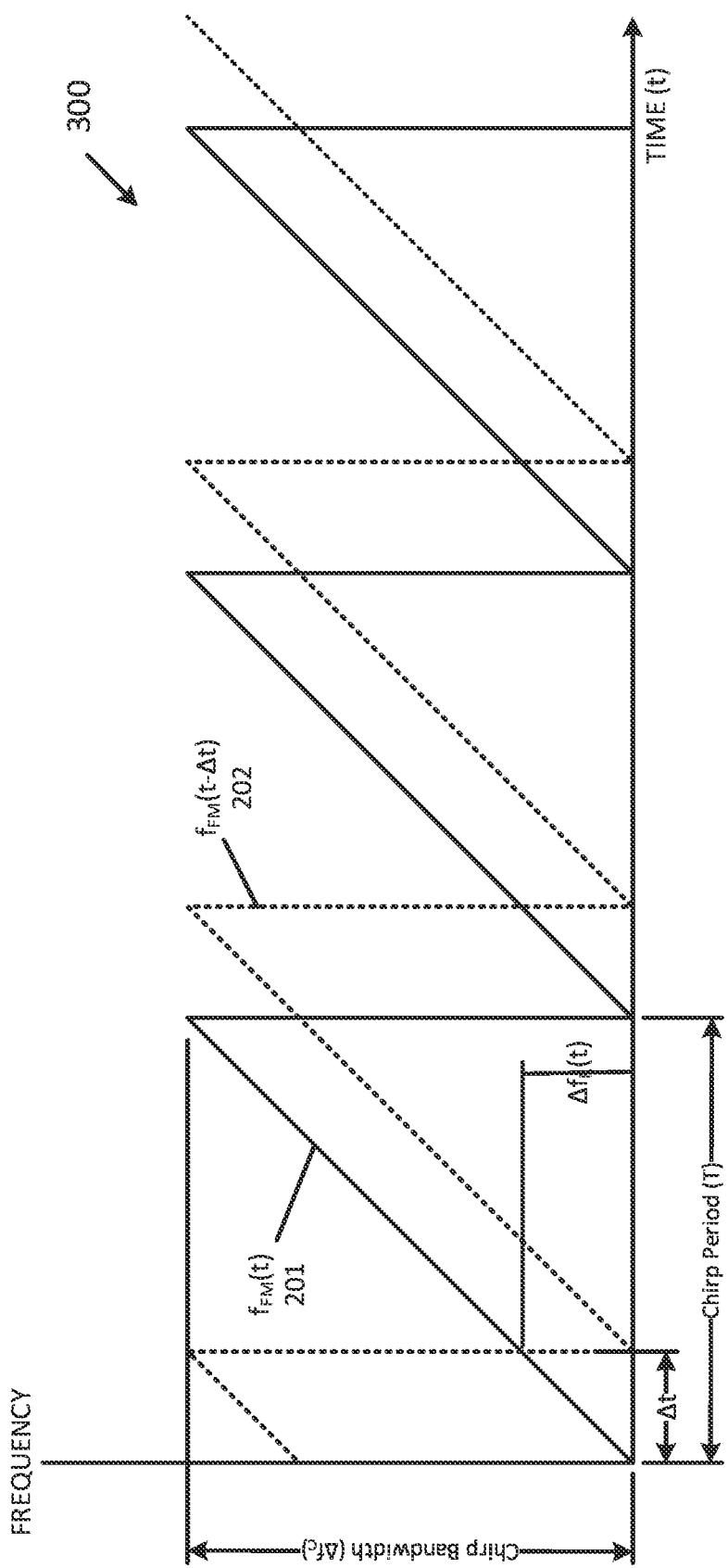
FIG. 3 is a time-frequency diagram illustrating an example of FMCW LIDAR waveforms according to embodiments of the present disclosure.

FIG. 3 is a time-frequency diagram 300 of an FMCW scanning signal 201 that can be used by a LiDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_c$ and a chirp period $T_c$. The slope of the sawtooth is given as $k=(\Delta f_c/T_c)$. FIG. 3 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing $_{(\Delta f_{Rmax})}$ is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 4:
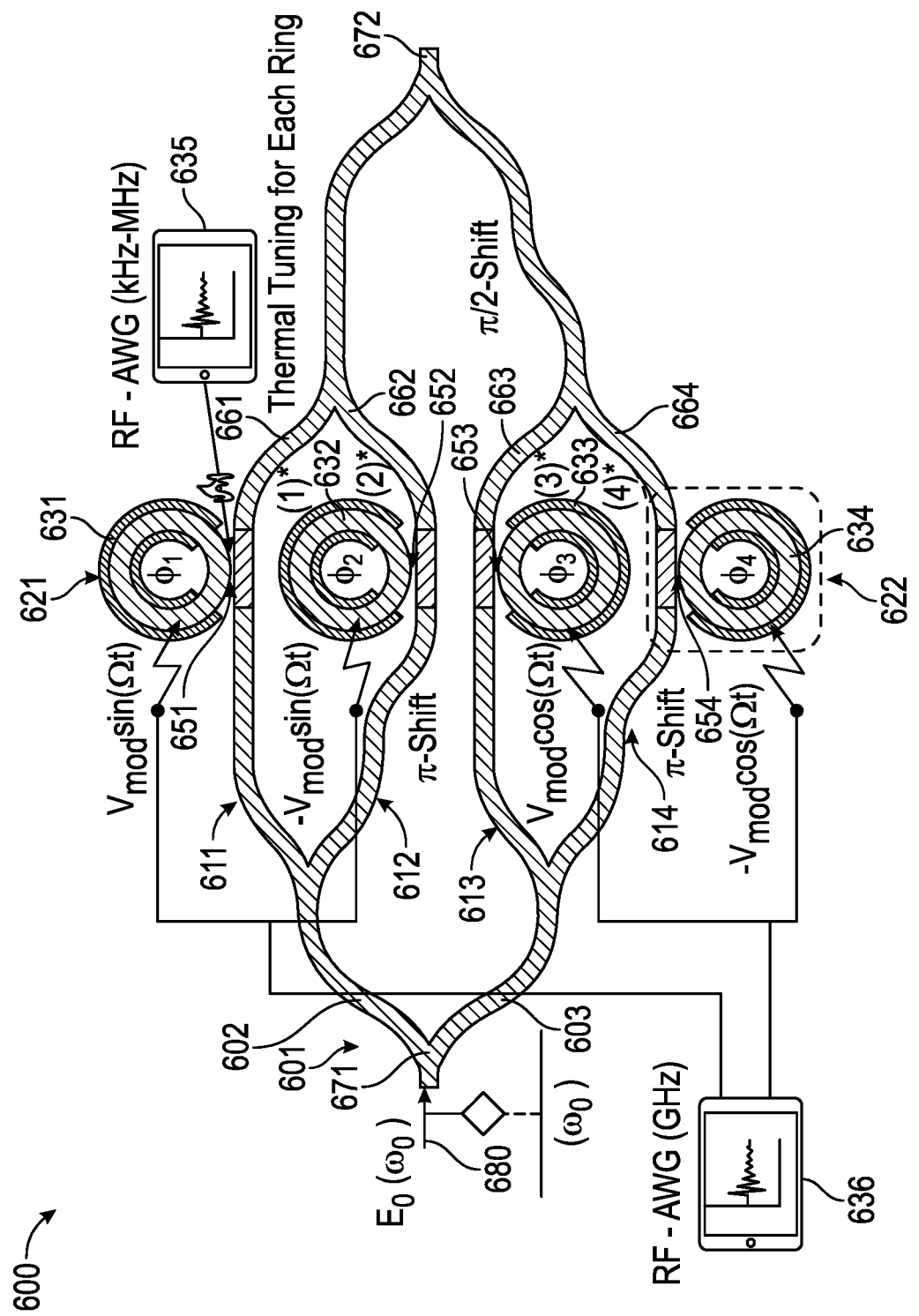
FIG. 4 is a diagram illustrating an example of a photonic IQ modulator using photonic resonators according to embodiments of the present disclosure.

FIG. 4 is a diagram illustrating an example of a photonic IQ modulator 600 in accordance with embodiments of the present disclosure. In accordance with the embodiments described herein, OFS applies a time-dependent phase shift to a propagating optical mode of an optical beam. For a silicon (Si) integrated photonic OFS waveguide, the phase shift can be generated by thermo-optic effect or plasma dispersion effect, both of which may create a respective change in a refractive index of the Si waveguide carrying the optical mode. Due to thermo-optic effect, an applied temperature change can modify a refractive index of the Si waveguide of arbitrary cross-sectional shape. Due to plasma dispersion effect, a voltage applied to a cross section of PN doped ridged silicon waveguide may alter the carrier density within the Si waveguide, thereby modifying the refractive index and an absorption of the propagating optical mode. The photonic IQ modulators described herein (e.g., photonic IQ modulator 600) may be based on at least one of the thermo-optic effect or the plasma dispersion effect. In one embodiment, the photonic IQ modulator described herein (e.g., photonic IQ modulator 600) may be based on the plasma dispersion effect to deliver the high-bandwidth phase shift. In one embodiment, the photonic IQ modulators described herein (e.g., photonic IQ modulator 600) may be based on the thermo-optic effect to control the static waveguide properties. In one embodiment, the photonic IQ modulators described herein may be based on both the plasma dispersion effect and the thermo-optic effect to deliver the high-bandwidth phase shift and control the static waveguide properties.

To implement OFS in applications in accordance with the embodiments described herein, the frequency shifted signal is combined with a local oscillator (LO), which is typically derived from the same light source. For example, the photonic IQ modulators described herein for OFS may include 2 parallel, nested Mach-Zehnder interferometers (MZIs). The photonic IQ modulators described herein may include a plurality of waveguide branches. For example, each MZI may include two waveguide branches. Each waveguide branch of the plurality of waveguide branches may include a phase shifter, and the two MZIs may be phase-biased at a null-transmission point. While more physically complex than a serrodyne MZI, the photonic IQ modulators described herein efficiently deliver optical power from the carrier to the desired sideband.

As shown in FIG. 4, the photonic IQ modulator 600 can include one or more Mach-Zehnder interferometers (e.g., Mach-Zehnder interferometer 601) which include photonic resonators. The photonic resonators described herein include, but are not limited to, microring resonators, photonic cavities including photonic crystal resonators, distributed Bragg mirror cavities, and the like. The photonic resonators described herein may be used as phase-shifters, for example, where a PN or PIN junction may be co-localized with each photonic resonator.

Referring to FIG. 4, the photonic IQ modulator 600 may include a nested Mach-Zehnder interferometer 601 adapted to include one or more photonic resonators (e.g., photonic resonators 631, 632, 633, or 634). Instead of propagating through a linear path, a corresponding portion of an input optical beam 680 circulates around each of the photonic resonators 631, 632, 633, or 634 a certain number of times. According to some embodiments, the number of times that portions of the optical beam circulate around photonic resonators 631, 632, 633, or 634 corresponds to a proportional physical length of an overall modular system that represents a proportional reduction of the physical length compared to straight-waveguide based systems. By taking advantage of the resonance enhancement of the photonic resonators described herein, the physical footprint, power consumption, and optical losses of the photonic IQ modulator 600 may be significantly reduced with respect to linear frequency shifting modulators.

According to some embodiments, the photonic resonator (e.g., 631, 632, 633, or 634) described herein can also be used as phase shifters to address the shortcomings of linear modulators. As depicted in FIG. 4, the photonic IQ modulator 600 may include a plurality of waveguide branches (e.g., 611, 612, 613, 614), where each waveguide branch of the plurality of waveguide branches is disposed to shift a phase of a corresponding portion of an input optical beam 680. The input optical beam 680 entering the photonic IQ modulator 600 may split into the plurality of waveguide branches (e.g., 611, 612, 613, 614). In each of the waveguide branches, the phase of the corresponding portion of the input optical beam is manipulated or modulated. Each waveguide branch (e.g., 611, 612, 613, or 614) may include a bus waveguide (e.g., 661, 662, 663, 664), and a photonic resonator (e.g., 631, 632, 633, or 634) coupled to the bus waveguide. In this way, each of the photonic resonators (e.g., 631, 632, 633, or 634) is disposed in close proximity to a respective bus waveguide. Each photonic resonator (e.g., 631, 632, 633, or 634) is also adapted to couple a corresponding portion of the optical beam 680 and circle the corresponding portion of the optical beam one or more times.

The photonic IQ modulator 600 may include an input port 671, an output port 672, one or more waveguide splitters to split the optical beam 680 into a plurality of portions of the optical beam 680 and route the plurality of portions of the optical beam 680 from the input port 671 to the plurality of waveguide branches (e.g., 611, 612, 613, 614), and one or more waveguide combiners to join the plurality of portions of the optical beam from the plurality of waveguide branches (e.g., 611, 612, 613, 614) into the output port 672.

Figure 5:
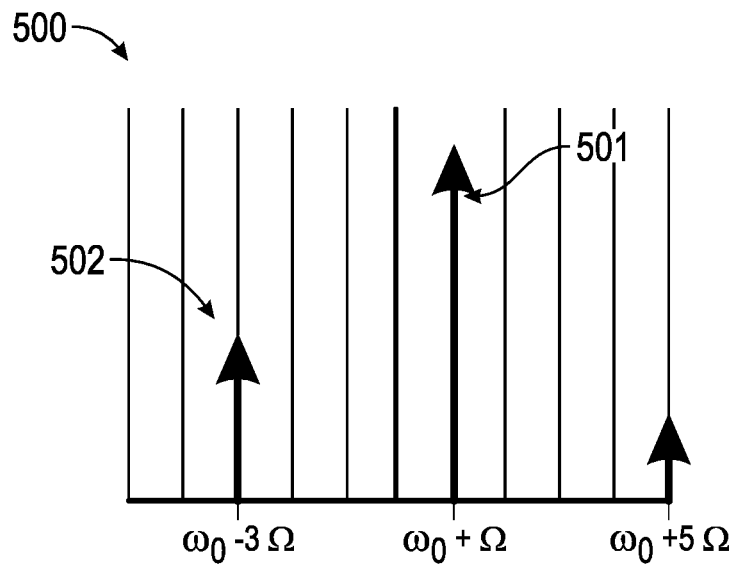
FIG. 5 is a diagram illustrating an RF spectrum of the photonic IQ modulator in FIG. 4, according to embodiments of the present disclosure.

FIG. 5 is a diagram illustrating an example of an output RF spectrum 500 from the photonic IQ modulator (e.g., 600) described herein. As illustrated in FIG. 5, the RF spectrum 500 is characterized by a dominant first-order frequency 501, e.g., at 100 MHz. A large suppression of the carrier, for example, −30 dB may be achieved as illustrated in FIG. 5. In some scenarios, a weaker third order frequency 502 may also be exhibited. Thus, the output RF spectrum 500 illustrates the photonic IQ modulator 600 efficiently delivers optical power from the carrier to the desired sideband (e.g., 501), thereby achieving better sideband suppression, reducing the optical loss, and improving CE.

Figure 6:
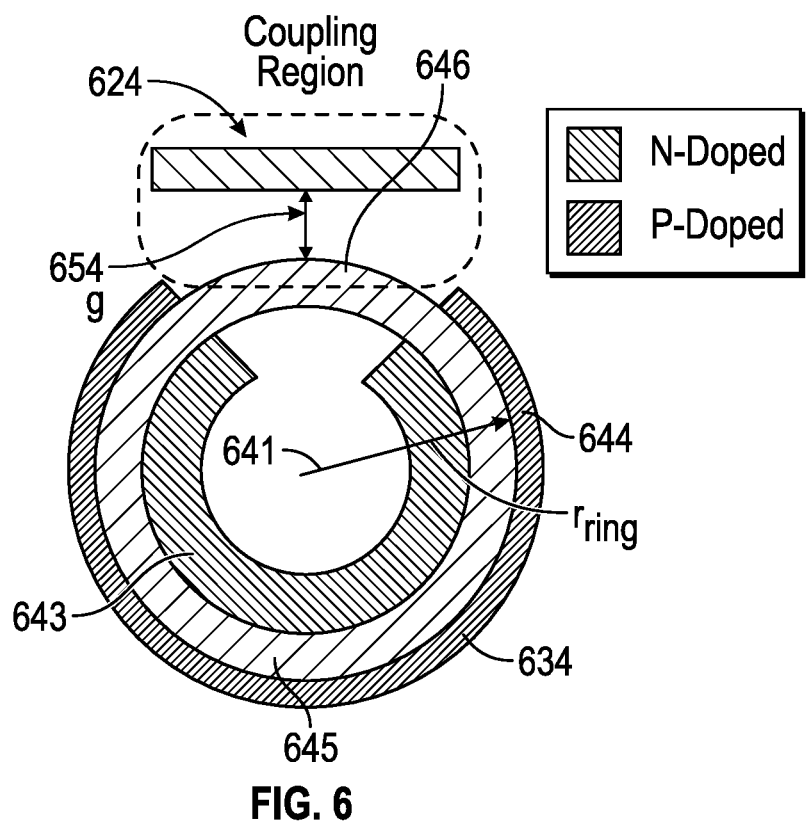
FIG. 6 is a diagram illustrating an enlarged view of one of the photonic resonators in FIG. 4, according to embodiments of the present disclosure.

FIG. 6 is a diagram illustrating an enlarged view of one photonic resonator 634 of the photonic IQ modulator 600 illustrated in FIG. 4, according to embodiments of the present disclosure. Referring to FIG. 4 and FIG. 6, the photonic IQ modulator 600 is able to perform a synthesis of desired RF spectra with high conversion efficiency, strong carrier and sideband suppression in a compact physical footprint, which demonstrates its ability to provide improved signal processing, heterodyne interferometry procedures, optical communications, and improved light detection and ranging (LiDAR) techniques. The photonic IQ modulator 600 may use the photonic resonators as key functional elements to perform the synthesis of the desired RF spectra.

Referring to FIG. 4 and FIG. 6, a photonic resonator (e.g., 631, 632, 633, 634) of length (e.g., 641) residing within each waveguide branch (e.g., 611, 612, 613, 614 of FIG. 4) of the photonic IQ modulator 600 may include a thermo-optic or plasma dispersion phase-shifter section (e.g., 645) of a first length $\eta_{mod}L_{ring}$ and a bare waveguide section (e.g., 646) of a second length $(1-\eta_{mod}L_{ring})$, where $\eta_{mod}$ is a modulator fill factor. The bare waveguide section (e.g., 646) constitutes a coupling region (e.g., 624) of the photonic resonator (e.g., 631, 632, 633, 634) to a corresponding bus waveguide (e.g., 661, 662, 663, 664 of FIG. 4), where a directional coupler (e.g., 651, 652, 653, 654) of length $L_{coupler}$ is formed by physical separation of the photonic resonator (e.g., 631, 632, 633, 634) from the bus waveguide (e.g., 661, 662, 663, 664), with a gap g. A corresponding resistive heater (not shown) may be positioned adjacent to the coupling region (e.g., 624), whose purpose is to tune the resonant wavelength of the photonic resonator (e.g., 634) to match the desired operating wavelength of the photonic IQ modulator 600.

The photonic IQ modulator 600 may include a series of 1×2 waveguide splitters which route the input optical beam 680 to each waveguide branch of the photonic IQ modulator 600. For example, a first portion of the optical beam is routed to branch 611 (Branch 1); a second portion of the optical beam is routed to branch 612 (Branch 2); a third portion of the optical beam is routed to branch 613 (Branch 3); and a fourth portion of the optical beam is routed to branch 614 (Branch 4). The branch 611 (Branch 1) is disposed to shift a phase of the first portion of the optical beam; the branch 612 (Branch 2) is disposed to shift a phase of the second portion of the optical beam; the branch 613 (Branch 3) is disposed to shift a phase of the third portion of the optical beam; and the branch 614 (Branch 4) is disposed to shift a phase of the fourth portion of the optical beam. Each waveguide branch may include a bus waveguide and a photonic resonator.

As depicted in FIG. 4 and FIG. 6, the photonic IQ modulator 600 may include the microring resonators coupled to the bus waveguides, where each microring resonator is disposed in a close proximity to a corresponding bus waveguide, and where each microring resonator is disposed to couple a corresponding portion of the optical beam and circle the corresponding portion of the optical beam one or more times. For example, a first microring 631 is disposed in a close proximity to the first bus waveguide 661 to couple the first portion of the optical beam and circle the first portion of the optical beam one or more times; a second microring 632 is disposed in a close proximity to the second bus waveguide 662 to couple the second portion of the optical beam and circle the second portion of the optical beam one or more times; a third microring 633 is disposed in a close proximity to the third bus waveguide 663 to couple the third portion of the optical beam and circle the third portion of the optical beam one or more times; and a fourth microring 634 is disposed in a close proximity to the fourth bus waveguide 664 to couple the fourth portion of the optical beam and circle the fourth portion of the optical beam one or more times.

Referring back to FIG. 4, the combination of bus waveguide, photonic resonator, and directional coupler constitutes a "Branch k" (611, 612, 613, 614) of the photonic IQ modulator 600, where k may include 1, 2, 3, and 4. For example, in one embodiment, the photonic IQ modulator 600 may include a first arm and a second arm. The first arm may include a first Mach-Zehnder interferometer "MZI1" 621 and the second arm may include a second Mach-Zehnder interferometer "MZI2" 622 (e.g., a second arm). For example, "Branch 1" 611 and "Branch 2" 612 may together constitute "MZI1" 621, where "Branch 3" 613 and "Branch 4" 614 may together constitute "MZI2" 622.

In one embodiment, "Branch 2" 612 and "Branch 4" 614 of the photonic IQ modulator 600 may include an additional length of waveguide, formed by a waveguide "S" bend, whose length is chosen such that a phase difference of $(2m+1)\pi$, where m is an integer, is generated between the individual branches of "MZI1" 621 and "MZI2" 622. "Branch 2" 612 may include a first waveguide "S" bend. "Branch 4" 614 may include a second waveguide "S" bend.

The photonic IQ modulator 600 may further include a series of 2×1 waveguide combiners join the phase-modified modes from each waveguide branch into the final output of the photonic IQ modulator 600. Following MZI2 622 and preceding the final 2×1 combiner, there may exist an additional length of waveguide, formed by a waveguide "S" bend, whose length is chosen to produce a phase difference of between MZI1 621 and MZI2 622, biasing the output of each MZI in quadrature. There may be a third waveguide "S" bend between the second MZI2 622 and the final 2×1 combiner. The photonic IQ modulator 600 may include a first arm 602 and a second arm 603. The second arm 603 may include the third waveguide "S" bend, and where a length of the third waveguide "S" bend is determined based on a phase difference of a corresponding portion of the optical beam between the first arm 602 and the second arm 603.

Referring to FIGS. 4-6, the photonic resonators (631, 632, 633, 634) may operate at critical coupling and with a resonance tuned to wo based on a combination of a radius (e.g., 641) of each ring $r_{ring}$ (e.g., 634), a coupling gap g of the directional coupler (e.g., 654) for each ring, and a thermal tuning of the coupling region for each ring generated by a resistive heater 635 and a kHz RF arbitrary waveform generator (AWG) 636. In one embodiment, the radius 641 of each ring $r_{ring}$ (e.g., 634) may be selected based on an operating frequency of the photonic IQ modulator 600. For example, there may be an integer number of wavelengths corresponding to the operating frequency that may fit around a circumference of each ring $r_{ring}$ (e.g., 634). If the radius of the ring is too large, the ring may take more space and generate more resonant frequencies. If the radius of the ring is too small, the ring may have a large optical loss. In one embodiment, the radius of each ring may be from 5 microns to 50 microns. For example, the radius of each ring may be 10 microns. In one embodiment, the coupling gap g of the directional coupler (e.g., 654) for each ring may be from 0.2 micron to 1 microns. In one embodiment, the coupling gap g of the directional coupler (e.g., 654) for each ring may be from 0.3 to 0.7 microns. As an example, the coupling gap g of the directional coupler (e.g., 654) for each ring may be 0.5 microns.

In one embodiment, the photonic IQ modulator 600 may further include a set of resistive heaters, where each resistive heater is positioned adjacent to a coupling region (e.g., 624) of a corresponding photonic resonator (e.g., 634), e.g., microring resonator, to tune a resonant wavelength of the corresponding microring resonator to match the operating wavelength. For example, each resistive heater may be positioned from 0.5 micron to 5 microns to the coupling region (e.g., 624) of the corresponding photonic resonator (e.g., 634). The photonic IQ modulator 600 may further include a set of feedback loops, where each feedback loop is disposed to control a corresponding resistive heater. In order for the IQ modulator 600 to operate properly, the resonance of each photonic resonator, e.g., microring, may need to be exactly at the operating wavelength (e.g., the input optical beam wavelength), thus, each photonic resonator, e.g., microring, has to have some mechanism to tune the resonance to match the operating wavelength. The feedback loop may be applied for compensating temperature change to allow the photonic resonator, e.g., the microring, to resonate at the operating wavelength.

A GHz frequency AWG and direct-current (DC) source (not shown) may be used to drive the PN region of the phase shifter (e.g., N-doped region 643, P-doped region 644). For example, a four-ring structure may be used with suitably designed RF drive to enable efficient delivery of optical power to the desired first order sideband with strong suppression of the optical carrier and higher-order harmonics at $(-1)^n(2n+1)\Omega$, where n is an integer. This "harmonic pre-distortion" scheme extends the operation bandwidth of the device, especially for applications where interference from sidebands n is equal or larger than 1 can pollute/distort the received signal, e.g., heterodyne interferometry and LiDAR. The disclosed photonic IQ modulator 600 may be 20 times smaller than comparable linear Mach-Zehnder modulator, may deliver a large of −7 dB of power at the desired frequency Ω and provide a sideband suppression ratio of larger than 30 dB at the n=1, 2 harmonics.

Figure 7A:
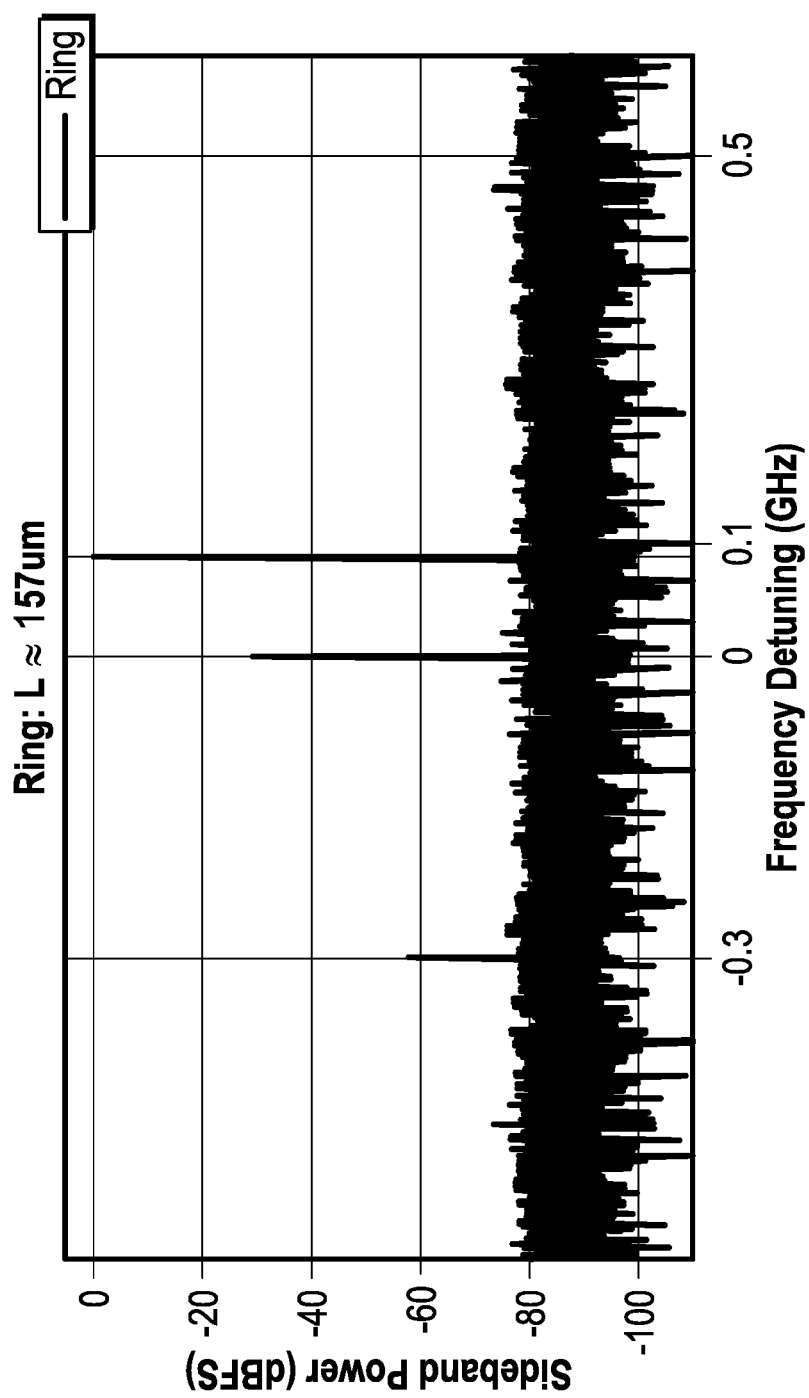
FIG. 7A is a diagram illustrating an example of RF response of a photonic IQ modulator according to embodiments of the present disclosure.

FIG. 7A is a diagram illustrating an example of RF response of an IQ modulator according to embodiments of the present disclosure. FIG. 7B is a diagram illustrating a comparison of the RF response of the IQ modulator with a conventional linear IQ modulator having the same length as the photonic IQ modulator 600. FIG. 7C is a diagram illustrating a comparison of the RF response of a linear IQ modulator having a length required to match the power in the n=0 sideband. The calculated RF response of the photonic IQ modulator 600 is shown in FIG. 7A. As an example, $L_{ring}$=157 um corresponding to a ring radius of 25 um, $\eta_{mod}$=0.75, and the photonic IQ modulator 600 is operated in the small signal regime with a drive voltage of 0.1 V for a phase shifter characterized by a $V_\pi L$=1.8 [V·cm]. The drive frequency $\Omega 2/\pi$=100 MHz. The illustrated response shows strong carrier suppression of −30 dB and single-sideband modulation (n=0), where the n=1 sideband is about −60 dB.

FIG. 7B and FIG. 7C illustrate the advantages of the IQ modulator described by embodiments of the present disclosure. Referring to FIG. 7B, the RF response of a linear IQ modulator having a length equal to the ring length 157 um is plotted against the photonic IQ modulator 600 response, showing a n=0 sideband power 30 dB lower than the photonic IQ modulator 600. For example, a linear IQ modulator may require a length 24×L$_{ring}$ to generate the same sideband power as the photonic IQ modulator 600. the cavity. Thus, the physical footprint of a photonic IQ modulator 600 is reduced compared to linear IQ modulator, by a factor equivalent to 74×, for example.

Figure 8A:
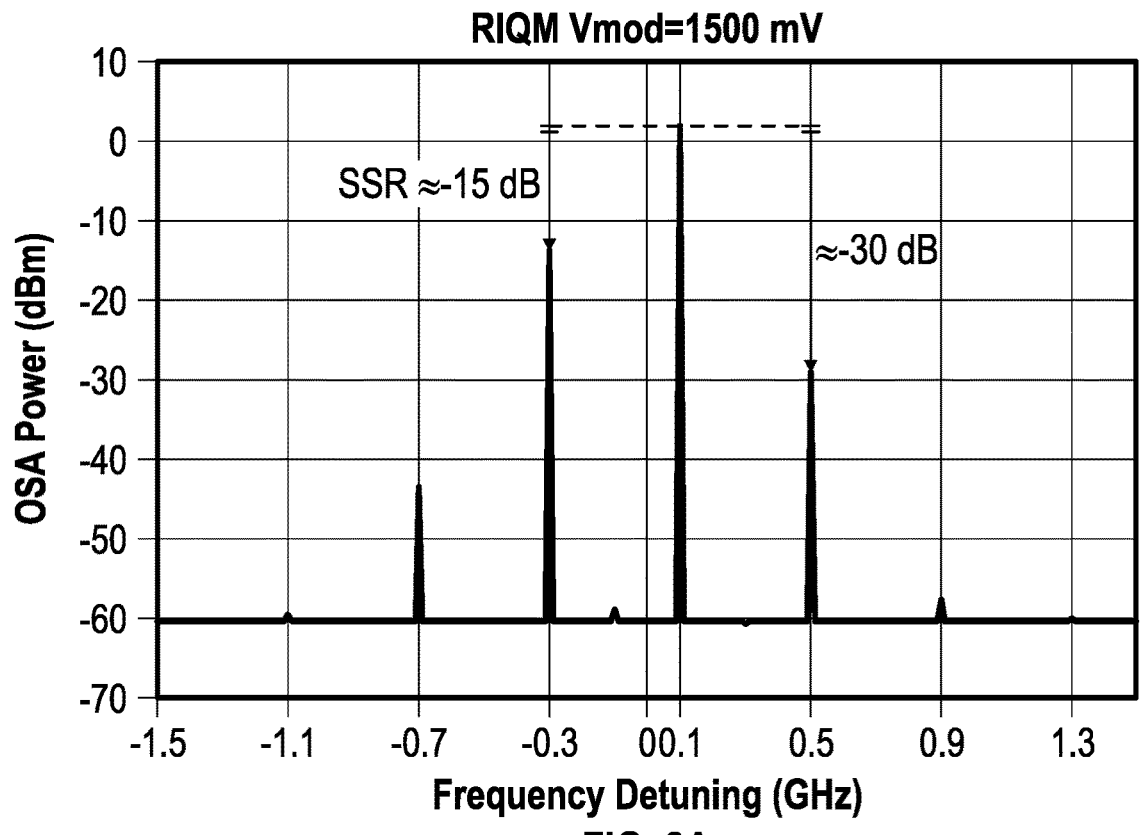
FIG. 8A is a diagram illustrating an example of RF response of a photonic IQ modulator calculated from a physical model according to embodiments of the present disclosure.

FIG. 8A is a diagram illustrating an example of an IQ modulator RF response calculated from a physical model incorporating actual photonic device properties. As an example, the drive voltage is 1.5 V and the input optical power is 10 dBm, a conversion efficiency of −8 dB and a SSR of −15 dB is illustrated. Spurious modulation lines occur at and as a result of residual amplitude modulation in the phase shifter, though the amplitude is very small.

The conversion efficiency (CE) of the photonic IQ modulator 600 is an important metric. This quantity may be estimated from a physical photonic circuit model, which incorporates waveguide geometries, material parameters, and the factor of the microring phase shifters. The model may use a combination of finite-difference time-domain and compact, time-domain circuit-level modelling to account for a realistic device behavior and is a more accurate representation than a phenomenological model.

FIG. 8A illustrates the RF response of a photonic IQ modulator 600 having the same L$_{ring}$=157 um and driven with a modulation voltage of 1.5 V and frequency of 100 MHz, according to some embodiments. A continuous-wave optical source with an input power of 10 dBm excites the photonic IQ modulator 600, and the output spectrum is calculated via Fourier transformation of the time-domain output. As illustrated in FIG. 8A, the sideband dominates the RF spectrum with a power of 2 dBm, representing a large conversion efficiency of −8 dB. The SSR, determined in this case by the magnitude of the sideband, occurring at −300 MHz detuning with respect to the optical carrier frequency respectively, is −15 dB. Additionally, the optical carrier is suppressed to a value below the simulation noise floor. Accordingly, these data indicate that the disclosed photonic IQ modulator 600 properly functions as a carrier-suppressed, single-sideband modulator with a very compact physical footprint.

Figure 8B:
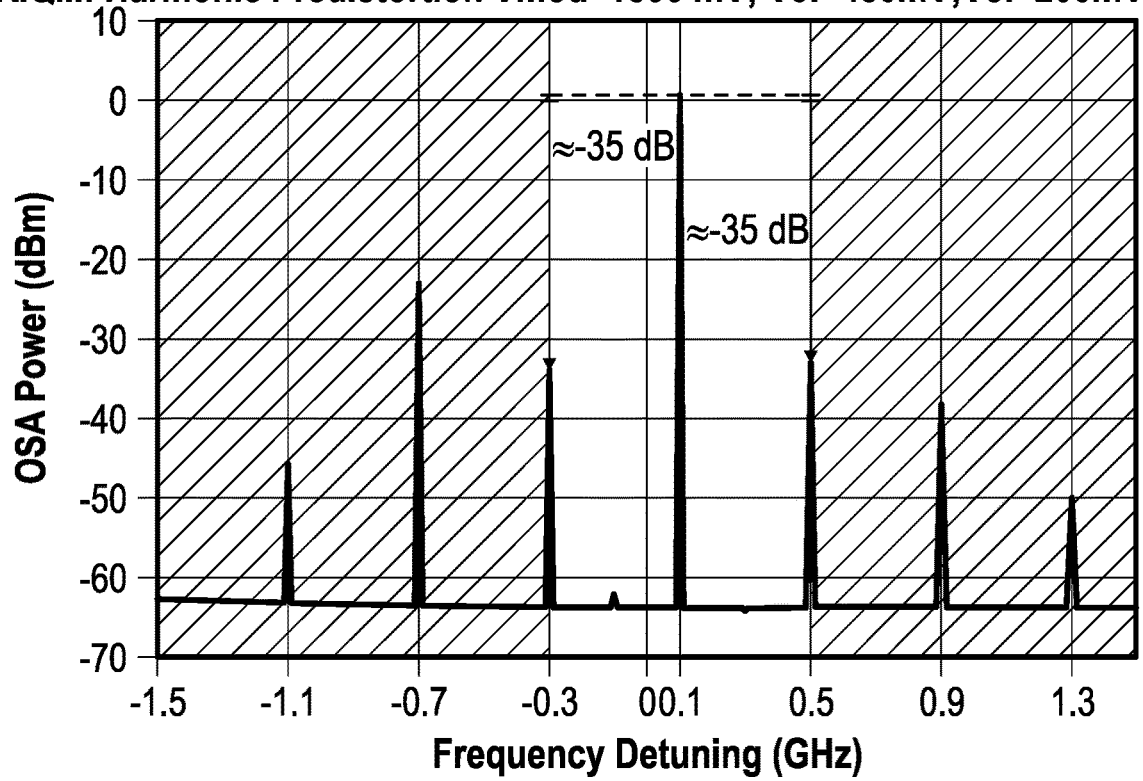
FIG. 8B is a diagram illustrating an example of RF response of a photonic IQ modulator with a harmonic predistortion drive scheme according to embodiments of the present disclosure.

FIG. 8B is a diagram illustrating an example of an IQ modulator RF response with a harmonic predistortion drive scheme, according to some embodiments. It is advantageous to obtain the highest possible CE and SSR from the photonic IQ modulator 600. In some cases, simply increasing the drive voltage may lead to a regime where the magnitude of the sideband at saturates, and continuously larger power is delivered to the sidebands. To combat this effect, a "harmonic predistortion" scheme may be implemented, where the RF drive signal incorporates components at higher harmonic frequencies, so as to cancel-out their contribution to the synthesized RF output.

FIG. 8B illustrates the RF response of the photonic IQ modulator 600 incorporating harmonic predistortion. This technique is effective, maintaining, in some cases, a~2 dBm amplitude of while suppressing the and sidebands by >30 dB. The increase of power within the harmonics may be addressed either by incorporating more drive harmonics in the input RF signal and readjusting the coefficients, or, in some scenarios, filtering a photo-detected photonic IQ modulator 600 signal.

Referring to FIG. 8B, the photonic IQ modulator 600 RF response is illustrated with the harmonic predistortion. The non-grayed area represents the frequency tuning range of interest. As an example, an SSR of −35 dB is achieved for both the tuned harmonics, with amplitudes being 450 mV or 200 mV.

Figure 9:
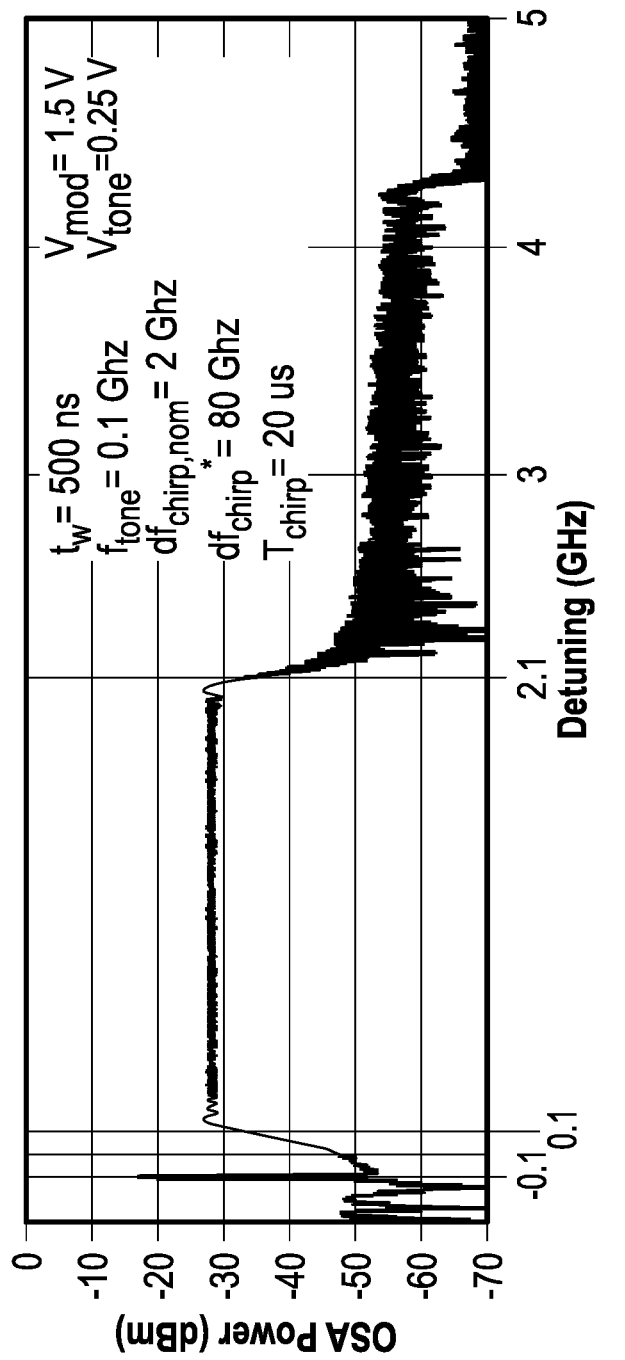
FIG. 9 is a diagram illustrating an example of a photonic IQ modulator model showing synthesis of a single tone+chirp RF spectrum according to embodiments of the present disclosure.

FIG. 9 is a diagram illustrating an example of a photonic IQ modulator 600 model showing synthesis of a single tone+chirp RF spectrum, according to embodiments of the present disclosure. In addition to single-tone synthesis as discussed above, the photonic IQ modulator 600 can synthesize more general RF spectra by engineering the drive signals applied to each branch, akin to the harmonic predistortion scheme. As an example, FIG. 9 shows the RF response of the photonic IQ modulator 600 calculated using the physical model for the case of a single-frequency tone placed at =−100 MHz, and 2 GHz-bandwidth linear frequency chirp starting a +100 MHz detuning from the optical carrier.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. An interferometer comprising
a plurality of waveguide branches comprising a plurality of bus waveguides and a plurality of photonic resonators, wherein a first waveguide branch of the plurality of waveguide branches comprises:
a first photonic resonator coupled to a first bus waveguide, wherein the first photonic resonator is disposed to couple and circle a first portion of an optical beam at the first photonic resonator to generate a first phase shift of the first portion of the optical beam, wherein the first phase shift is the same as a second phase shift of a second photonic resonator coupled to a second bus waveguide, and
wherein the interferometer comprises a Mach-Zehnder interferometer, and wherein the Mach-Zehnder interferometer forms at least a portion of an in-phase and quadrature (IQ) modulator.

2. The interferometer of claim 1, wherein the plurality of photonic resonators comprises a plurality of microring resonators.

3. The interferometer of claim 2, wherein each microring resonator of the plurality of microring resonators comprises a phase shifter section and a bare waveguide section, and wherein the phase shifter section comprises a thermo-optic phase shifter section or a plasma dispersion phase shifter section.

4. The interferometer of claim 2, wherein each waveguide branch further comprises a directional coupler formed by a physical separation of the microring resonator from the bus waveguide with a gap.

5. The interferometer of claim 2, further comprising a plurality of resistive heaters, each resistive heater positioned adjacent to a coupling region of a corresponding microring resonator to tune a resonant wavelength of the corresponding microring resonator to match an operating wavelength.

6. The interferometer of claim 5, further comprising a plurality of feedback loops, wherein each feedback loop is disposed to control a corresponding resistive heater.

7. The interferometer of claim 1, wherein the interferometer comprises a first arm and a second arm, wherein the first arm comprises the first waveguide branch of the plurality of waveguide branches, and wherein the second arm comprises a second waveguide branch of the plurality of waveguide branches.

8. An interferometer comprising
a plurality of waveguide branches comprising a plurality of bus waveguides and a plurality of photonic resonators, wherein a first waveguide branch of the plurality of waveguide branches comprises:
a first photonic resonator coupled to a first bus waveguide, wherein the first photonic resonator is disposed to couple and circle a first portion of an optical beam at the first photonic resonator to generate a first phase shift of the first portion of the optical beam, wherein the first phase shift is the same as a second phase shift of a second photonic resonator coupled to a second bus waveguide, wherein the interferometer comprises a first arm and a second arm, wherein the first arm comprises the first waveguide branch and a second waveguide branch of the plurality of waveguide branches, and wherein the second arm comprises a third waveguide branch and a fourth waveguide branch of the plurality of waveguide branches.

9. The interferometer of claim 8, wherein the second waveguide branch comprises first waveguide "S" bend, and wherein a length of the first waveguide "S" bend is determined based on a phase difference of a corresponding portion of the optical beam between the first waveguide branch and the second waveguide branch.

10. The interferometer of claim 9, wherein the fourth waveguide branch comprises a second waveguide "S" bend, and wherein a length of the second waveguide "S" bend is determined based on a phase difference of a corresponding portion of the optical beam between the third waveguide branch and the fourth waveguide branch.

11. The interferometer of claim 10, wherein the second arm comprises a third waveguide "S" bend, and wherein a length of the third waveguide "S" bend is determined based on a phase difference of a corresponding portion of the optical beam between the first arm and the second arm.

12. The interferometer of claim 1, further comprising an input port, an output port, one or more waveguide splitters to split the optical beam into a plurality of portions of the optical beam and route the plurality of portions of the optical beam from the input port to the plurality of waveguide branches, and one or more waveguide combiners to join the plurality of portions of the optical beam from the plurality of waveguide branches into the output port.

13. A light detection and ranging (LiDAR) system, comprising:
an optical source to emit an optical beam; and
an in-phase and quadrature (IQ) modulator comprising:
a plurality of waveguide branches comprising a plurality of bus waveguides and a plurality of photonic resonators, wherein a first waveguide branch of the plurality of waveguide branches comprises:
a first photonic resonator coupled to a first bus waveguide, wherein the first photonic resonator is disposed to couple and circle a first portion of an optical beam at the first photonic resonator to generate a first phase shift of the first portion of the optical beam, wherein the first phase shift is the same as a second phase shift of a second photonic resonator coupled to a second bus waveguide.

14. The system of claim 13, wherein the plurality of photonic resonators comprises a plurality of microring resonators.

15. The system of claim 14, wherein each microring resonator of the plurality of microring resonators comprises a phase shifter section and a bare waveguide section, and wherein the phase shifter section comprises a thermo-optic phase shifter section or a plasma dispersion phase shifter section.

16. The system of claim 14, wherein each waveguide branch further comprises a directional coupler formed by a physical separation of the microring resonator from the bus waveguide with a gap.

17. The system of claim 14, wherein the IQ modulator further comprises a plurality of resistive heaters, wherein each resistive heater is positioned adjacent to a coupling region of a corresponding microring resonator to tune a resonant wavelength of the corresponding microring resonator to match an operating wavelength.

18. A method of optical frequency shifting, comprising:
receiving an optical beam from an optical source;

directing the optical beam to a plurality of waveguide branches comprising a plurality of bus waveguides and a plurality of photonic resonators; and coupling and circling a first portion of the optical beam at a first photonic resonator coupled to a first bus waveguide of the plurality of waveguide branches to generate a first phase shift of the first portion of the optical beam, wherein the first phase shift is the same as a second phase shift of a second photonic resonator coupled to a second bus waveguide.

19. The method of claim 18, wherein the plurality of photonic resonators comprises a plurality of microring resonators, the method further comprising tuning a resonant wavelength of each microring resonator of the plurality of microring resonators to match an operating wavelength by a plurality of resistive heaters.

* * * * *